US011568428B1

(12) United States Patent
Agarwal et al.

(10) Patent No.: US 11,568,428 B1
(45) Date of Patent: Jan. 31, 2023

(54) DETECTION AND BREAKING OF PRICING LOOPS IN AN E-COMMERCE MARKETPLACE

(71) Applicant: Amazon Technologies, Inc., Seattle, WA (US)

(72) Inventors: Manish Agarwal, Seattle, WA (US); Aniket Bhatt, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 342 days.

(21) Appl. No.: 16/710,471

(22) Filed: Dec. 11, 2019

(51) Int. Cl.
G06Q 30/00 (2012.01)
G06Q 30/02 (2012.01)
G06F 16/23 (2019.01)
G06Q 10/08 (2012.01)

(52) U.S. Cl.
CPC ......... *G06Q 30/0201* (2013.01); *G06F 16/23* (2019.01); *G06Q 10/0838* (2013.01)

(58) Field of Classification Search
CPC . G06Q 30/0201; G06Q 10/0838; G06F 16/23
See application file for complete search history.

(56) References Cited

U.S. PATENT DOCUMENTS 5,873,069 A * 2/1999 Reuhl ................ G06Q 30/0611
705/20
2003/0177103 A1 * 9/2003 Ivanov ............... G06Q 30/0202
705/400
2014/0278804 A1 * 9/2014 Lanxner ............. G06Q 30/0206
705/7.35
2018/0204233 A1 * 7/2018 Binkiewicz ........ G06Q 30/0206

FOREIGN PATENT DOCUMENTS

GB          2527414 A  * 12/2015  ......... G06Q 30/0206

OTHER PUBLICATIONS

Bernstein et al., A General Equilibrium Model for Industries with Price and Service Competition, https://www0.gsb.columbia.edu/mygsb/faculty/research/pubfiles/4098/federgruen_equilibrium.pdf, Operations Research, vol. 52, No. 6, Nov.-Dec. 2004 , pp. 868-886. (Year: 2004).*

* cited by examiner

*Primary Examiner* — Patricia H Munson
*Assistant Examiner* — Uche Byrd
(74) *Attorney, Agent, or Firm* — Klarquist Sparkman, LLP

(57) ABSTRACT

A system and method of automatically detecting pricing loops by generating a price-history database and searching the database for recurring pricing update patterns. If a price update pattern is detected, then the price republishing is blocked until a next event occurs to interrupt the pricing loop. A pricing engine searches the price-history database before publishing a new price. If a past price recurs multiple times over a predetermined time period, then it is saved as a candidate value for a pricing loop. A current price to be published is compared to the candidate value, and if there is a match, then the current price is suppressed.

20 Claims, 8 Drawing Sheets

DETECTION AND BREAKING OF PRICING LOOPS IN AN E-COMMERCE MARKETPLACE

BACKGROUND

In an e-commerce marketplace, third-party sellers often change prices of products because of a variety of factors, including cost, competitor's pricing, shipping, etc. Shoppers in an e-commerce marketplace tend to compare prices between sellers and are most likely to purchase an item from the seller with the lowest price.

Repricing algorithms used by the marketplace hosts typically account for a third-party seller's rules for repricing, such as a minimum price for which they are willing to sell a product and, how to reprice goods compared to competitors (e.g., beat the lowest price by 1 cent), etc. The repricing algorithms allow sellers to stay competitive and grow profit margins, while protecting their bottom line.

DETAILED DESCRIPTION

Figure 1:
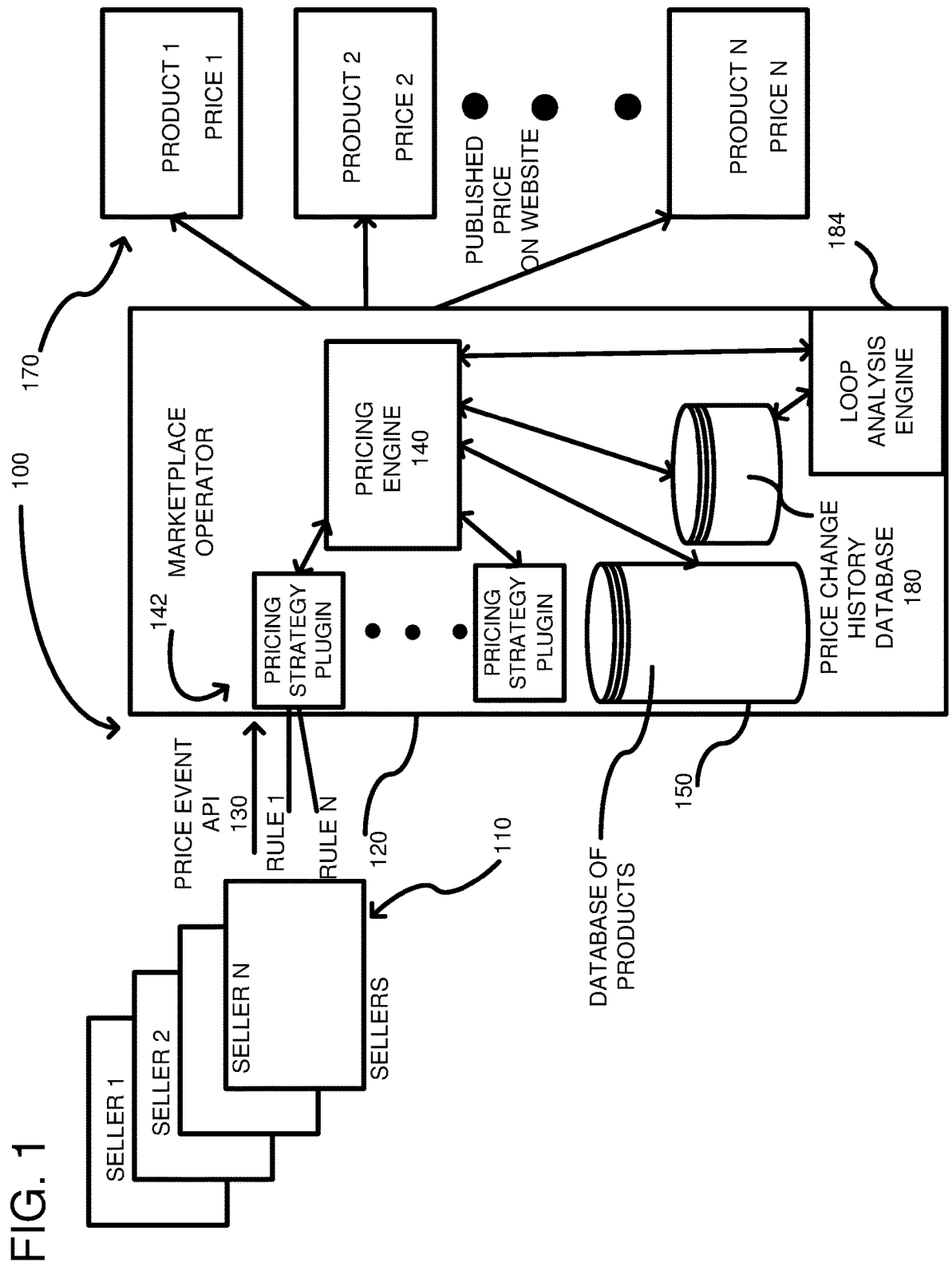
FIG. 1 is a system diagram for detecting and breaking pricing loops for products being sold through a marketplace operator.

Repricing algorithms get into pricing loops wherein a convergence on a final price is not reached. A pricing loop is a frequent cyclical price update that follows a repeating pattern and does not terminate without a change in an external signal. The pricing loop often results in the price of a product constantly changing on a website without reaching a settled price. Such loops result in a dramatic increase of network traffic through a repricing pipeline.

With a large number of sellers in an e-commerce marketplace, each having their own repricing rules, repricing algorithms iterate through millions of possible changes before arriving at a solution of selling prices for sellers of the same item that meet each seller's pricing rules. For example, if 60 sellers are selling the same item (e.g. a popular book), a repricing event for one seller causes the marketplace computer to analyze the effect of the repricing event on all the other 59 sellers. In such a case, millions of iterations of new sales prices for each seller occurs and, in the case of a pricing loop, the iterations never end. The number of iterations for repricing even a single product type uses significant CPU bandwidth, which slows the overall system.

Example pricing loops occur because of a price banded shipping configuration wherein shipping costs change based on a price range of a product in conjunction with a price matching of a competitor's price. As the price matching occurs, the shipping price switches between price bands, which then makes the overall price below the competitor price, causing the repricing algorithm to jump the price back up to the competitor price. But once at the competitor price, the shipping cost increases causing the price to drop again, and so forth. Similar pricing loops can occur due to competition between an external $3^{rd}$ party repricer and a local repricer. Other pricing loops can likewise occur due to cross marketplace repricing, such as between countries.

A method is disclosed, according to one embodiment, of automatically detecting pricing loops by (a) generating a price history database that captures recent price updates due to repricing, (b) leveraging this database to identify recurring patterns of prices over period of time, (c) leveraging a pricing engine to break/interrupt the pricing loop by blocking the price publishing. The benefit is to save redundant price update traffic and save hardware cost and avoid price volatility for products on a retail website, which assists in avoiding customer confusion.

A method is disclosed, according to another embodiment, of automatically detecting pricing loops by generating a price-history database and searching the database for recurring pricing update patterns. If a price update pattern is detected, then the price republishing is be blocked until a next event occurs to interrupt the pricing loop. A pricing engine searches the price-history database before publishing a new price. If a past price recurs multiple times over a predetermined time period, then it is saved as a candidate value for a pricing loop. A current price to be published is compared to the candidate value, and if there is a match, then the current price is suppressed. In another example, a stock keeping unit (SKU)(i.e., a product identifier) is identified as a candidate due to its association with a recurring price. When a current price is about to publish, metadata associated with the candidate SKU is compared to metadata associated with the current SKU. If the metadata matches, then the pricing engine suppresses the price publication, which breaks the pricing loop. The seller is notified that repricing is temporarily paused. Thus, a global price history is generated and used to identify repeating patterns of price changes. For price changes that are in a repeating pattern, a signal is sent to a pricing engine to break the repeating pattern. The repeating pattern is associated with a price of a product and generally relates to a base price and/or a shipping price.

FIG. 1 shows a system 100 for receiving pricing events and publishing updated prices. A plurality of sellers 110 are coupled to a marketplace operator 120 through a network (not shown). The sellers 110 include server or client computers and corresponding software for generating price events, such as by using an Application Program Interface (API). For example, a price event API 130 is shown as a request made to a service of the marketplace operator 120. A service is a software function provided at a network address over the web or the cloud. Clients initiate service requests to servers and servers process the requests and return appropriate responses. The client service requests are typically initiated using, for example, an API request, such as API request 130. For purposes of simplicity, service requests will be generally described below as API requests, but it is understood that other service requests can be made. An API request is a programmatic interface to a defined request-response message system, typically expressed in JSON or XML, which is exposed via the web—most commonly by means of an HTTP-based web server. Thus, in certain implementations, an API is defined as a set of Hypertext Transfer Protocol (HTTP) request messages, along with a definition of the structure of response messages, which can be in an Extensible Markup Language (XML) or JavaScript Object Notation (JSON) format. The API specifies a set of functions or routines that perform an action, which includes accomplishing a specific task or allowing interaction with a software component. When a service receives the API request from a client device, the service generates a response to the request and send the response to the endpoint identified in the request.

The marketplace operator 120 includes one or more server computers for running a marketplace and for publishing competing third-party products from sellers 110. When a price event is received, the marketplace operator 120 uses a pricing engine 140 (also called a price modification engine) to apply rules associated with products or services. The products/services descriptions are stored in a database 150 that is coupled to the pricing engine 140. The rules are accessed through plug-ins 142. Upon requests from clients, such as shoppers entering search queries (not shown), the marketplace operator 120 publish the resulting products and associated prices, as shown at 170. Each product has an associated plug-in 142 that defines the rules associated with the particular product including a pricing strategy for the product. There are be a variety of different plug-ins that a seller can select based on their pricing strategy. Whichever plug-in the seller selects is associated with seller's product. Generally speaking, a "plug-in" includes, but is not limited to, a software component that plugs into a larger application to add functionality. When an application supports plug-ins, it can, for example, enable customization without recompilation. Additionally, in some instances, plug-ins reduce the need for redeployment of the larger application, as functionality can be added through the plug-ins without modifying or redeploying the application itself. The common examples are the plug-ins used in web browsers to add new features such as search-engines, virus scanners, or the ability to utilize a new file type, such as a new video format. The plug-in structure allows the pricing engine 140 to call various price modification rules associated with a product. Additionally, the seller's particular rules can be implemented easily with the individual plug-ins. When a call is made to one of the plug-ins, a NOOP or a price change parameter is returned. The NOOP means no change to the price, while the price change parameter includes an updated price or a differential change of the current price.

The rules that are encoded within the plugins 142 allow changing of price to match, beat or otherwise change based on other competing products offered. The rules might also include changing shipping costs associated with the price. Some sellers have a banded shipping configuration for a SKU, such as a price within a first set of limits is a first shipping price, and within a second set of limits, a second shipping price, etc. Due to the banded shipping configuration and price matching, the pricing engine 140 changes prices of products automatically when a price event occurs. For example, one seller changing a price of a product results in a change of price for products for competing sellers. Each time a price event occurs, the results are logged in a database 180 of prior events including a price change history. The database 180 has a variety of fields based on the particular application, but typical fields include a SKU number or other product identifier, a price associated with the price event, shipping costs associated with the price event, a timestamp, and potentially other metadata associated with the price event.

A loop analysis engine 184 is used to search the database 180 and determine if a pricing loop is recurring within a time window. In some embodiments, a threshold number of times through the loop sets off a trigger event. For example, if a price keeps changing but returning to a previous price over a short time window, a loop exists that is broken by taking corrective action, such as suppressing the price modification for the product until another event occurs. Another example of a loop is wherein a sequence of price changes repeat over time, such as changes from a first price to a second price, then back to the first price and then second price, etc. When a price loop is detected, the loop analysis engine 184 signals to the pricing engine 140 that a loop has been detected. In response, the pricing engine 140 suppresses the publication of a price for the product. In other embodiments, the pricing engine 140 requests the loop analysis engine 184 to check each price before publication to ensure the price is not part of a pricing loop. The loop analysis engine 184 checks the database 180 with the candidate price to be published and determines whether the candidate price triggers a signal by exceeding a threshold number of recurrences over a time interval. For example, if the price is being changed to a price that the product has previously been changed to three times in a 5 second period, then the loop analysis engine 184 reports to the pricing engine 140 that a loop exists. The pricing engine 140 then suppresses publication of the new price and breaks the loop. Otherwise, if there is no price loop detected, then the pricing engine 140 updates the database 180 with the new pricing event and publishes the new price on a website, as is shown at 170.

Figure 2:
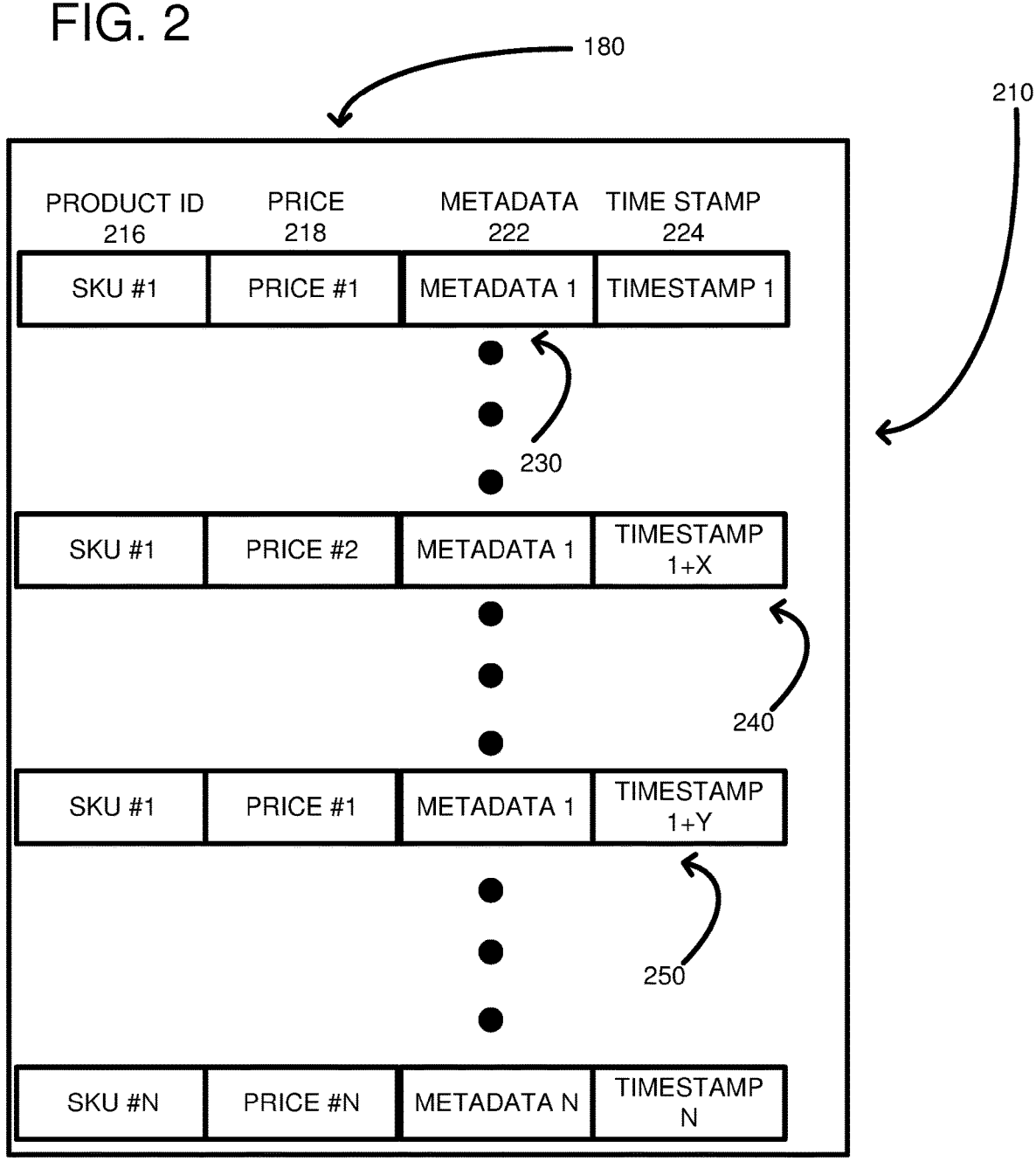
FIG. 2 is an example database having a pricing loop.

FIG. 2 shows the database 180 in further detail. The database 180 includes a plurality of entries 210 associated with one or more price events. Each entry includes a product identifier field 216, a price field 218, one or more metadata fields 222, and a time stamp field 224. The product identifier 216 is a SKU or other alpha/numeric combination that uniquely identifies a product. The price 218 is a price that was published for the product identified. The metadata 222 includes other attributes associated with the pricing event, such as shipping costs, a country, weight, etc. The time stamp 224 is a time when the entry was entered. The database 180 is shown with N entries, where N is any integer number. Generally, each publication of a price results in an entry in the database to maintain a price history table of past pricing updates. At 230, a product having a SKU #1 has a price #1 and is logged at timestamp 1. The same product is shown having another event 240 in the database 180 at 240, which shows the price field 218 change to price #2 at timestamp 1+X. Then at 250, the same product changes back to price #1 at timestamp 1+Y. A window of time is defined by the time difference between timestamp 1+Y and timestamp 1. The price for the same product changing from price #1, to price #2 and then back to price #1 is indicative of a loop, especially if the window of time is short. Such a change causes a counter to increment to 1 indicating a single occurrence of a loop. If such a looping pattern repeats and the counter is incremented to a threshold amount within a threshold window of time, then an alarm condition exists wherein a pricing loop is detected for the product.

Figure 3:
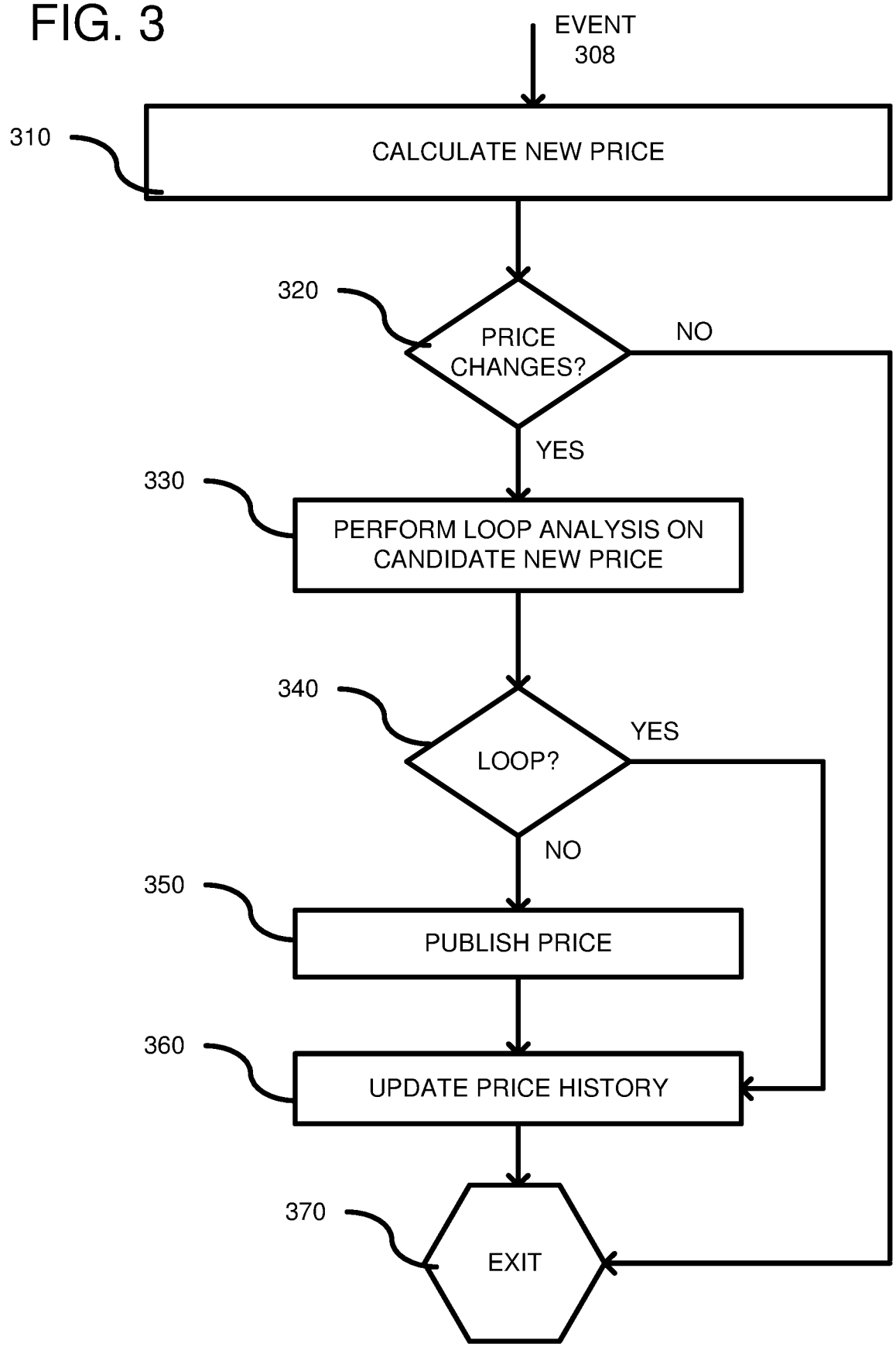
FIG. 3 is a flowchart according to one embodiment for detecting and breaking pricing loops.

FIG. 3 is a flowchart according to one embodiment to detect and break pricing loops. At 308, an event is received. Receipt is generally by a server computer within the marketplace operator. In one example, the event 308 is an API received from a seller to modify price of a product, such as is shown by the API 130 of FIG. 1. Instead of an API, the event also can be an event that is a result of another event, such as when the pricing engine 140 performs a price matching according to rules within the plugins 142. In process block 310, based on the event 308, a new price is calculated. Calculating the price includes the base price and the shipping costs. The rules that are within the plugins 142 (FIG. 1) dictate the overall resulting price. In decision block 320, a check is made whether there was a price change. Based upon the results of the rules, an event does not necessarily change the price. For example, if a rule is already satisfied (e.g., price already the lowest), then there is no need to modify the price. If decision block is answered in the negative, then the routine exits at 370. However, if decision block 320 is answered in the affirmative, then at 330, a loop analysis is performed on the candidate new price that was calculated in process block 310. The loop analysis is performed by the loop analysis engine 184 by searching the database 180. For example, in FIG. 2, for a candidate price of price #1, a search is performed to determine if price #1 was a result of a price change multiple times over a short time window. If so, then in decision block 340, a loop is detected and the price history is updated at process block 360 without publishing a price. By failing to publish the price, the loop is disrupted or broken and publications of a new price do not occur again without a new event. Otherwise, decision block 340 is answered in the negative and the price is published at process block 350 and the price history is updated at process block 360 to reflect the new price. The process exits at block 370 and repeats upon receiving another event 308.

Figure 4:
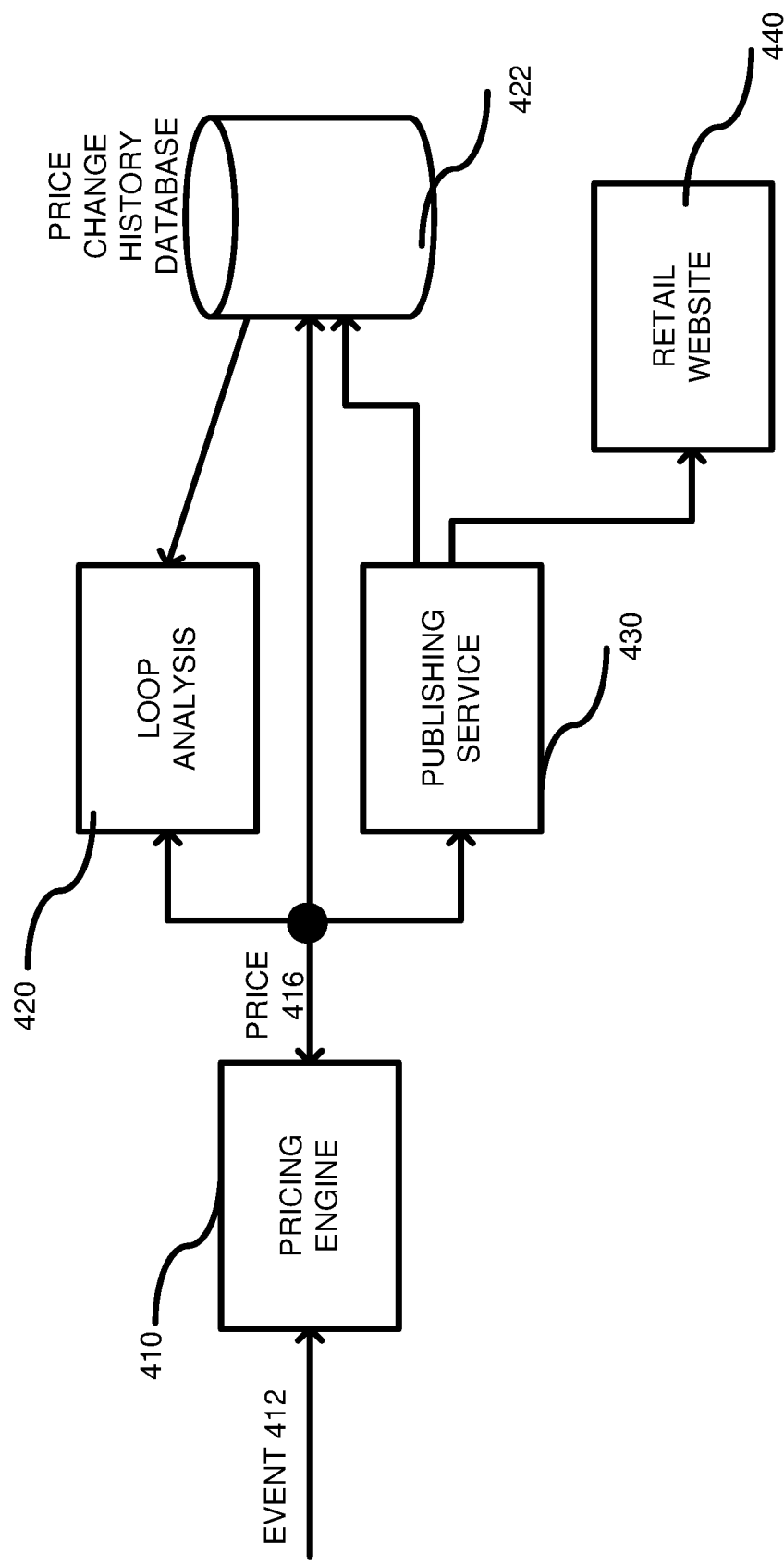
FIG. 4 is a system diagram according to another embodiment for detecting and breaking pricing loops.

FIG. 4 is a system according to another embodiment for detecting pricing loops. A pricing engine is shown at 410 and receives an event 412. The pricing engine 410, based on pricing rules associated with the product (see plug-ins 142, FIG. 1), generates a candidate price 416. The pricing engine 410 transmits the candidate price 416 to a loop analysis engine 420. The loop analysis engine 420 searches a price change history database 422 to determine whether a candidate price 416 calculated by the pricing engine 410 should be published. Specifically, a check is made by the loop analysis engine 420 whether a repeating sequence of price changes exists within a predefined time window for the product in a price change history database 422. The candidate price 416 is used in the determination of whether a repeating sequence exists, such as by assuming that it is already part of the price change history database 422. If there is a match of a repeating sequence, then the loop analysis engine 420 reports to the pricing engine 410 that a loop exists and publication is suppressed by not transmitting the candidate price 416 to a publishing service 430. On the other hand, if there is not a match of a repeating sequence, then the candidate price 416 is published through a transmission from the pricing engine 410 to the publishing service 430, and the price 416 is input into the price change history database 422. The publishing service 430 delivers the price to a retail website 440 for viewing by customers. The publishing service 430 also updates the database 422 with any published price changes. The loop analysis engine 420 performs its loop analysis for different time windows, such as a predetermined number of seconds, minutes, days, weeks or months. Additionally, in some embodiments, loop repetition is considered a loop after a threshold number of iterations (e.g., 3, 4, 5, etc.).

Figure 5:
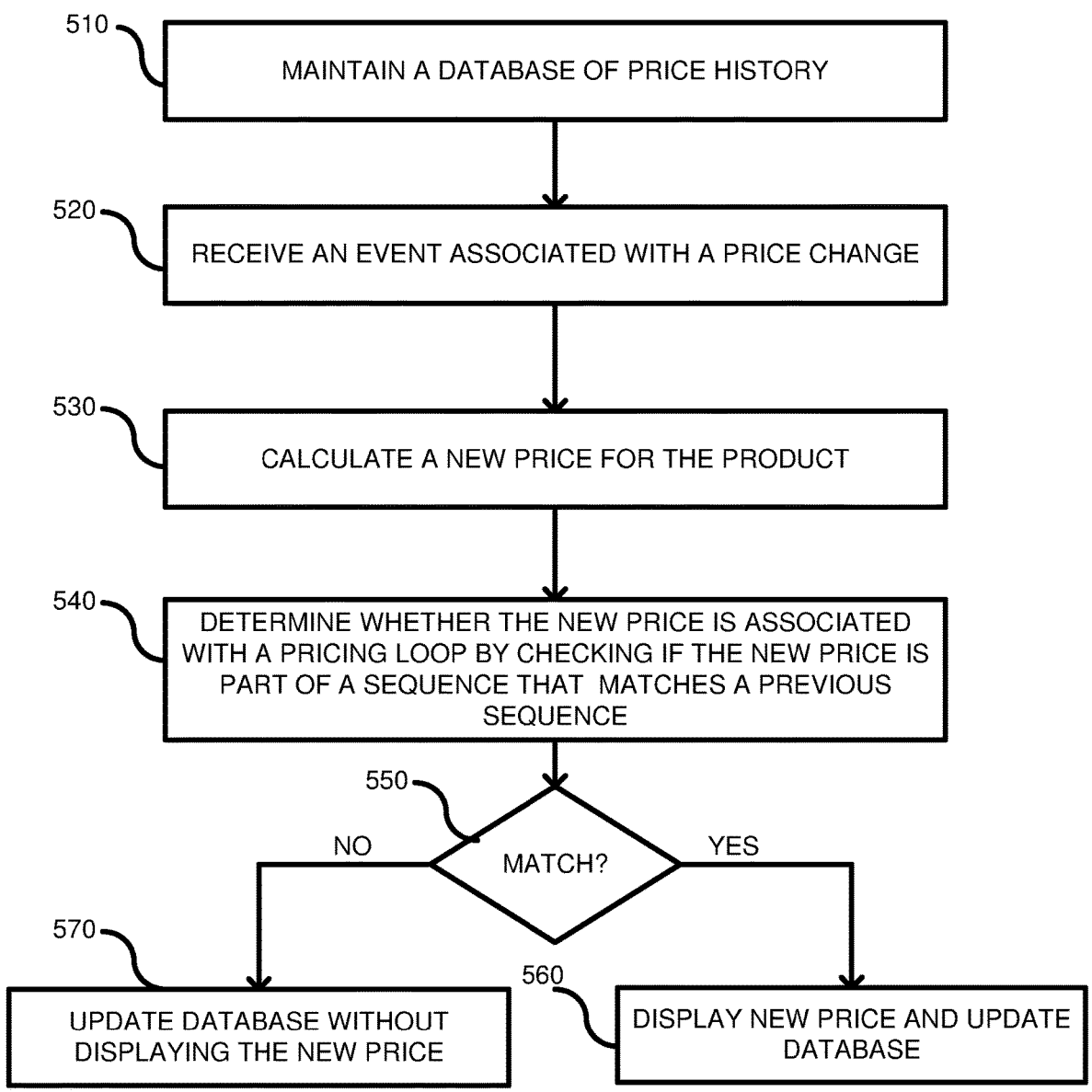
FIG. 5 is a flowchart according to one embodiment for detecting pricing loops.

FIG. 5 is a flowchart according to another embodiment for detecting price loops. In process block 510, a database is maintained including pricing history. For example, as shown in FIG. 2, the price and associated product identifier is stored for past price changes. Other data, such as shipping costs, a timestamp and other metadata is also be maintained. In process block 520, an event is received associated with a price change. For example, an API request is received for a price change (FIG. 1, at 130) or a previously received price change request results in an automatic price change due to the price-matching rules within the plug-ins 142. In process block 530, a new price is calculated for the product. For example, based on the event, in FIG. 4, the pricing engine 410 calculates a new price, which takes into account shipping costs. The new price is called a candidate price. In process block 540, a determination is made whether the new price is associated with a pricing loop. For example, in FIG. 4, the pricing engine 410 checks the database 422 using the candidate price and a determination is made by the loop analysis engine 420 whether the new price results in a price loop. In one embodiment, the determination includes checking a sequence of price changes and determining whether the new price is part of a sequence that matches the previous sequence of price changes. In decision block 550, a check is made whether the new price matches an existing price considered to be in a loop. If so, then the new price is displayed (process block 560), such as by using the publishing service 430 (FIG. 4). Alternatively, in process block 570, the database is updated, but without displaying the new price. Thus, the pricing engine suppresses the new price to break the loop.

Figure 6:
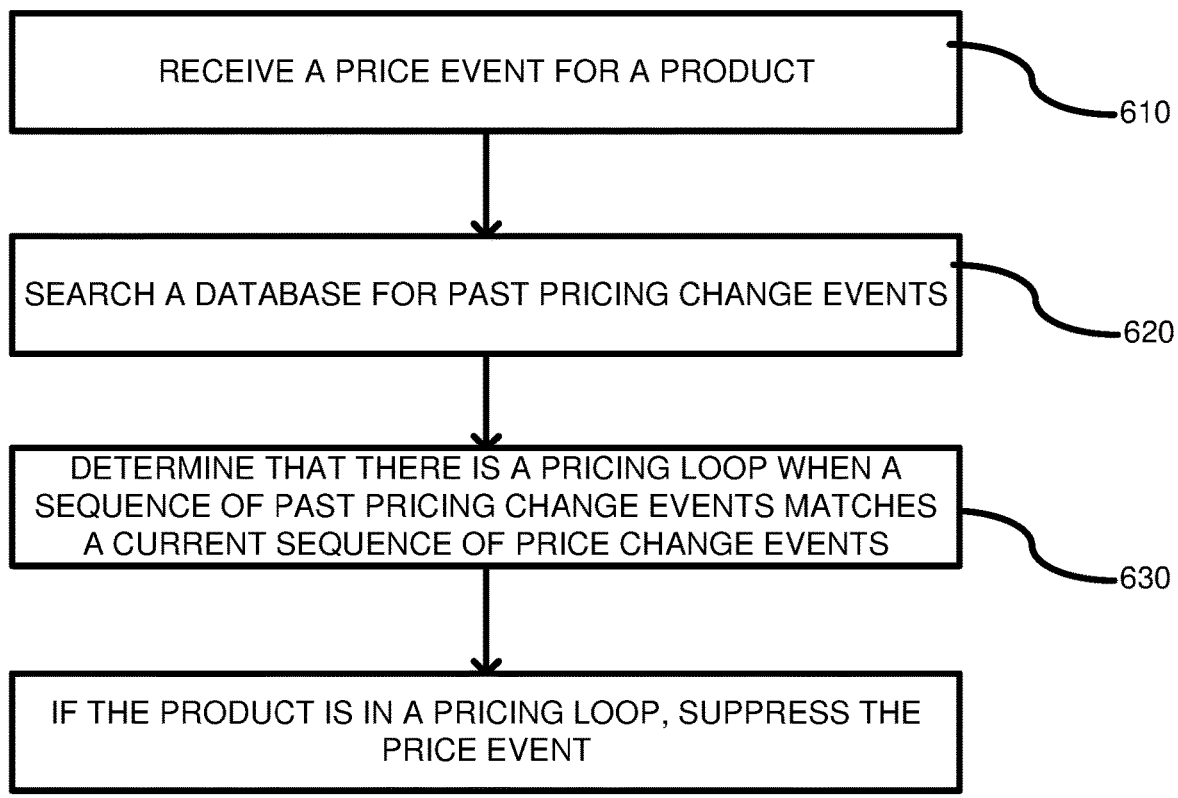
FIG. 6 is a flowchart according to another embodiment for detecting pricing loops.

FIG. 6 is a flowchart according to another embodiment for detecting and suppressing pricing loops. In process block 610, a price event is received for a product. The recipient is generally a server computer, such as a server computer in the marketplace operator 120. The price event is an external signal, but in some embodiments is an internally-generated signal based upon changing a product's price to match the price of a competitor product. In process block 620, a database is searched for a pricing loop. For example, in FIG. 2, a pricing loop is detected because for the same product (SKU #1), the price #1 repeats one or more times over a predetermined time window. A threshold is set in some embodiments, wherein the price needs to repeat N number of times (wherein N is any integer, such as 5) before identifying the repetition as a loop. Thus, the price event relates to a product (SKU #1) and the new candidate price is used and compared against previous price changes to determine if there is a pricing loop. In process block 630, if the product is in a pricing loop, the price event is suppressed. In one embodiment, suppressing the price event includes not displaying the new price to break the loop. For example, in FIG. 4, the price 416 is not transmitted to the publishing service 430 so that the display of the new price on the website is suppressed.

Figure 7:
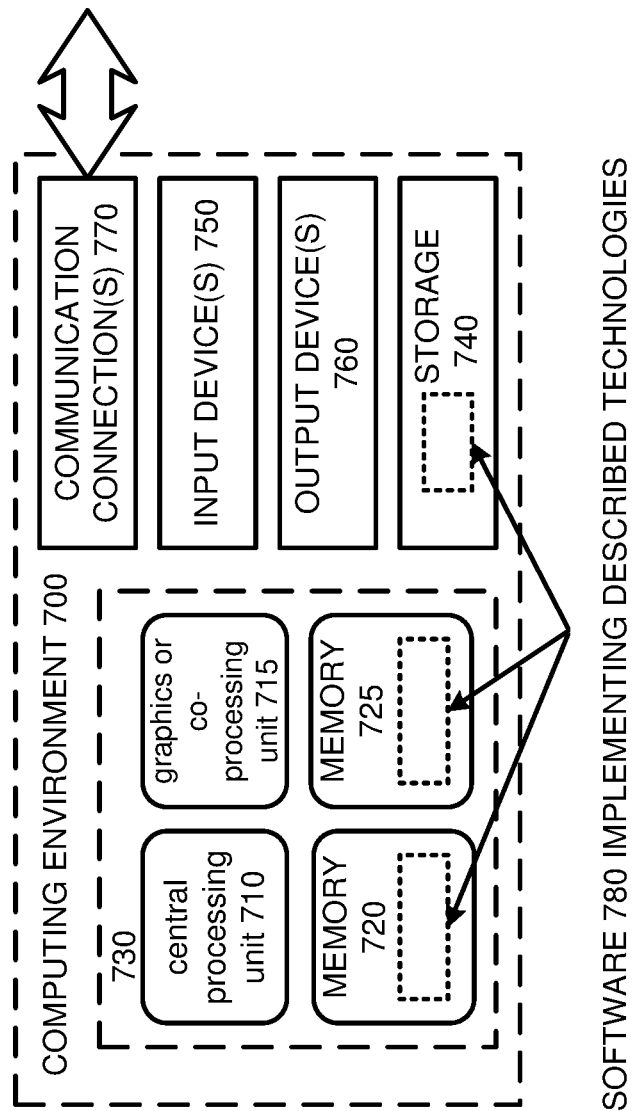
FIG. 7 depicts a generalized example of a suitable computing environment in which the described innovations may be implemented.

FIG. 7 depicts a generalized example of a suitable computing environment 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.). The computing environment 700 is within the marketplace operator in one embodiment.

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Figure 8:
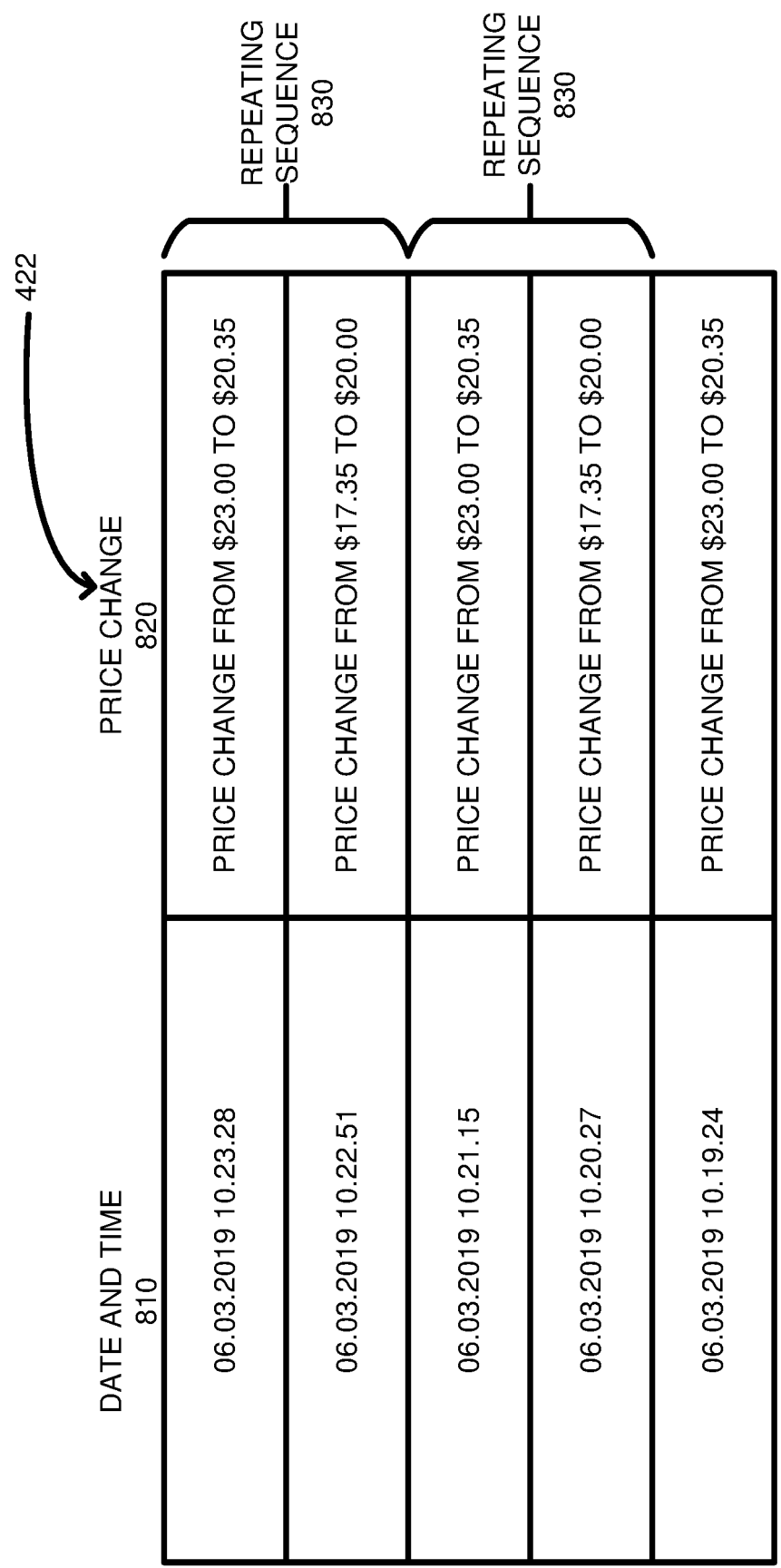
FIG. 8 shows an example of entries within a price change history database.

FIG. 8 shows an example of the price change history database 422. The database 422 generally includes additional fields, but only a date/time field 810 and a price change field 820 are shown for simplicity. The price change history database 422 is shown with five entries, which is a small subset of the database to illustrate a looping sequence 830 that includes multiple price change events. A sequence can include a first price change, a second price change and then repeating the first price change and the second price change again. Other sequences include additional intermediate price changes before repeating. Nonetheless, in some embodiments, the loop analysis engine has a threshold number of iterations that a loop repeats in order to be declared a loop. In some embodiments, the loop analysis engine also uses the date and time field 810 to ensure the repeating sequence 830 is within a desired time window. For example, a loop is detected if the time window of the repeating sequence is within 1 day, whereas repetition that spans more than that time window is not considered a loop.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of repricing products offered in an e-commerce marketplace, the method implemented in a marketplace computer system communicatively coupled to multiple seller computer systems by a network, the method comprising:
   maintaining a database of pricing history for products selling in the e-commerce marketplace, the products associated with plug-ins that define rules for pricing the products;
   receiving an event associated with a price change associated with a product;
   calculating, by a pricing engine in the marketplace computer system, a new price for the product, wherein the pricing engine executes rules in one of the plug-ins associated with the product;
   determining, by a loop analysis engine in the marketplace computer system, whether the new price is associated with a pricing loop, wherein the loop analysis engine searches the database and detects that the new price is associated with a pricing loop when the new price is associated with a repeating sequence of price changes in the database; and
   if the loop analysis engine determines that the new price is associated with the pricing loop, breaking the pricing loop, wherein breaking the pricing loop comprises updating, by the pricing engine, the database without displaying the new price in the e-commerce marketplace;
   otherwise, if the loop analysis engine does not determine that the new price is associated with the pricing loop, displaying the new price in the e-commerce marketplace and updating the database.

2. The method of claim 1, wherein the pricing history includes shipping costs, and wherein shipping costs are used in determining whether the new price is in the pricing loop.

3. The method of claim 1, wherein the event includes a change in price of the product or a change in price of shipping the product.

4. The method of claim 1, wherein updating the database includes storing a product identifier associated with the product, storing the new price and storing associated shipping costs.

5. The method of claim 1, wherein the pricing loop is associated with a time window wherein a first price of the product changes to a different price, then back to the first price.

6. The method of claim 5, wherein the price changes back to the first price from the different price a threshold number of times to be considered the pricing loop.

7. A method of repricing products in an e-commerce marketplace, executed by a marketplace computer system communicatively coupled to multiple seller computer systems by a network, comprising:
   receiving a price event for a product competing against other sellers in an the e-commerce marketplace;
   in response to the pricing event, determining, by a loop analysis engine in the marketplace computer system, whether the price event is associated with a pricing loop, wherein the loop analysis engine searches a database including past pricing change events associated with the product and detects that the price event is associated with a pricing loop when a sequence of the past pricing change events matches a current sequence of price change events; and
   upon determining that the product is in a pricing loop, suppressing the pricing event so that the pricing event is not displayed in the e-commerce marketplace, wherein suppressing the pricing event breaks the pricing loop.

8. The method of claim 7, wherein the pricing event is associated with a price of the product or shipping costs associated with the product.

9. The method of claim 7, wherein the pricing loop is a repeating pattern of pricing updates within a predetermined period of time.

10. The method of claim 7, wherein the price event causes a pricing engine to re-price other products in the e-commerce marketplace.

11. The method of claim 7, further including updating the database with the pricing event.

12. The method of claim 11, wherein the pricing event includes a price for the product and a shipping cost associated with the product.

13. The method of claim 7, wherein the pricing loop is associated with a time window and wherein a first price of the product changes to a different price, then back to the first price.

14. The method of claim 13, wherein the price changes back to the first price from the different price a threshold number of times to be considered the pricing loop.

15. One or more non-transitory computer-readable storage media storing computer-executable instructions for causing a computer system communicatively coupled to multiple seller computer systems by a network to perform operations in an e-commerce marketplace comprising:
   receiving a price event for a product competing against other sellers in the e-commerce marketplace;
   in response to the pricing event, determining, by a loop analysis engine in the computer system, whether the price event is associated with a pricing loop, wherein the loop analysis engine searches a database including past pricing change events associated with the product and detects that the price event is associated with a pricing loop when a sequence of the past pricing change events matches a current sequence of price change events; and
   upon determining that the product is in a pricing loop, suppressing the pricing event so that the pricing event is not displayed in the e-commerce marketplace, wherein suppressing the pricing event breaks the pricing loop.

16. The one or more computer-readable storage media of claim 15, wherein the pricing event is associated with a price of the product or shipping costs associated with the product.

17. The one or more computer-readable storage media of claim 15, wherein the pricing loop is a repeating pattern of pricing updates within a predetermined period of time.

18. The one or more computer-readable storage media of claim 15, wherein the price event causes a pricing engine to re-price other products in the e-commerce marketplace.

19. The one or more computer-readable storage media of claim 15, further including updating the database with the pricing event.

20. The one or more computer-readable storage media of claim 15, wherein the pricing loop is associated with a time window and wherein a first price of the product changes to a different price, then back to the first price.

\* \* \* \* \*